US009667453B2

(12) United States Patent
Paker

(10) Patent No.: US 9,667,453 B2
(45) Date of Patent: May 30, 2017

(54) EQUALIZATION IN THE RECEIVER OF A MULTIPLE INPUT MULTIPLE OUTPUT SYSTEM

(71) Applicant: Telefonaktiebolaget L M Ericsson (publ), Stockholm (SE)

(72) Inventor: Özgün Paker, Waalre (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/898,194

(22) PCT Filed: Jun. 17, 2014

(86) PCT No.: PCT/EP2014/062779
§ 371 (c)(1),
(2) Date: Dec. 14, 2015

(87) PCT Pub. No.: WO2014/202643
PCT Pub. Date: Dec. 24, 2014

(65) Prior Publication Data
US 2016/0134441 A1    May 12, 2016

(30) Foreign Application Priority Data
Jun. 17, 2013 (EP) .................... 13172302

(51) Int. Cl.
*H03H 7/30* (2006.01)
*H03H 7/40* (2006.01)
(Continued)

(52) U.S. Cl.
CPC ..... *H04L 25/03057* (2013.01); *H04B 7/0413* (2013.01); *H04L 25/03171* (2013.01); *H04L 25/03242* (2013.01)

(58) Field of Classification Search
USPC ......................... 375/233, 340, 267
See application file for complete search history.

(56) References Cited

U.S. PATENT DOCUMENTS

2005/0135498 A1* 6/2005 Yee ...................... H04L 1/0631
375/267
2010/0067597 A1    3/2010 Park et al.

FOREIGN PATENT DOCUMENTS

EP    1578075 B1    10/2006
EP    1376921 B1    7/2008
(Continued)

OTHER PUBLICATIONS

Filipo Borlenghi et al., A 772Mbit/s 8.81bit/nJ 90nm CMOS Soft-Input Soft-output Sphere Decoder, Nov. 2011, IEEE Asian Solid-State Circuits Conference.*
(Continued)

*Primary Examiner* — Wednel Cadeau
(74) *Attorney, Agent, or Firm* — Coats & Bennett, P.L.L.C.

(57) ABSTRACT

Embodiments of the invention concern a method of equalizing (S9), in a turbo equalizing system (S10), by sphere decoding (S11) a signal transmitted over a channel by a multiple input multiple output system, comprising: receiving (S3) said transmitted signal, building (S4) at least one search tree, providing (S6) likelihoods of bits, for said transmitted signal, from said built search tree(s) and from said received transmitted signal, wherein equalizing method (S9) also comprises receiving feedback signal from a channel decoder (S8) of said turbo equalizing system (S10), and wherein said feedback signal is used to build (S4) said search tree(s).

13 Claims, 4 Drawing Sheets

(51) Int. Cl.
*H03K 7/00* (2006.01)
*H04L 25/03* (2006.01)
*H04B 7/0413* (2017.01)

(56) References Cited

FOREIGN PATENT DOCUMENTS

| EP | 1363405 B1 | 12/2009 |
|---|---|---|
| EP | 2520055 | 7/2011 |
| EP | 2448205 A1 | 5/2012 |
| WO | 2011080326 A1 | 7/2011 |

OTHER PUBLICATIONS

Liao, C., et al., "Combining Orthogonalized Partial Metrics: Efficient Enumeration for Soft-Input Sphere Decoder", 2009 IEEE 20th International Symposium on Personal, Indoor and Mobile Radio Communications, Sep. 13, 2009, pp. 1287-1291, IEEE.

Wu, B., et al., "Efficient VLSI implementation of soft-input soft-output fixed-complexity sphere decoder", IET Communications, (vol. 6 , Issue: 9), Jun. 14, 2012, pp. 1111-1118, Institution of Engineering and Technology.

Borlenghi, F., et al., "A 772Mbit/s 8.81 bit / nJ 90 nm CMOS Soft-Input Soft-Output Sphere Decoder", 2011 IEEE Asian Solid State Circuits Conference (A-SSCC), Nov. 14, 2011, pp. 297-300, IEEE.

Paker, O., et al., "A Low Cost Multi-standard Near-Optimal Soft-Output Sphere Decoder: Algorithm and Architecture", Design, Automation & Test in Europe Conference & Exhibition (DATE), Mar. 8, 2010, pp. 1402-1407, IEEE.

Schnorr, C., et al., "Lattice Basis Reduction: Improved Practical Algorithms and Solving Subset Sum Problems", Jan. 1, 1993, pp. 1-27, retrieved on Dec. 11, 2015, retrieved from internet: http://www.csie.nuk.edu.tw/~cychen/Lattices/Lattice%20Basis%20Reduction_%20Improved%20Practical%20Algorithms%20and%20Solving%20Subset%20Sum%20Problems.pdf.pdf&usg=AFQjCNEUCJKITEuHSTtAzW-QnL904aMLWg&sig2=ei61G1iSaqVGcvNHFUuQXg.

Studer, C., et al., "Soft-Input Soft-Output Single Tree-Search Sphere Decoding", IEEE Transactions on Information Theory, Oct. 1, 2010, pp. 4827-4842, vol. 56, No. 10, IEEE.

Studer, C., et al., "Soft-Output Sphere Decoding: Performance and Implementation Aspects", Fortieth Asilomar Conference on Signals, Systems and Computers, Oct. 29, 2006, pp. 2071-2076, IEEE.

Studer, C., et al., "Soft-Input Soft-Output Sphere Decoding", IEEE Int. Symposium on Information Theory (ISIT), Toronto, ON, Canada, Jul. 1, 2008, pp. 2007-2011, IEEE.

* cited by examiner

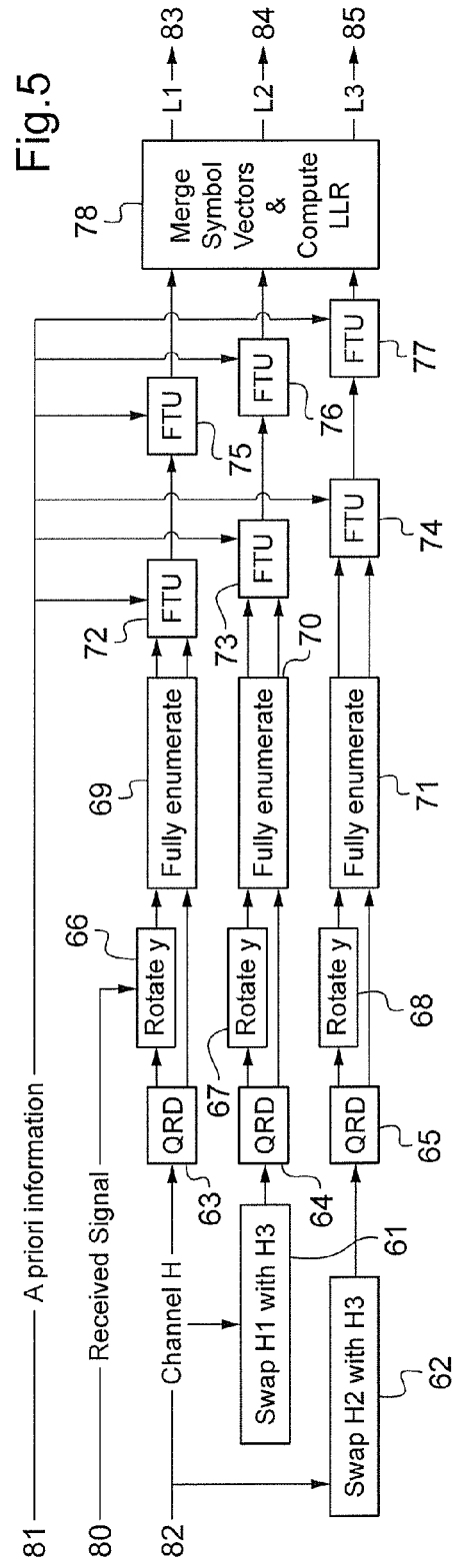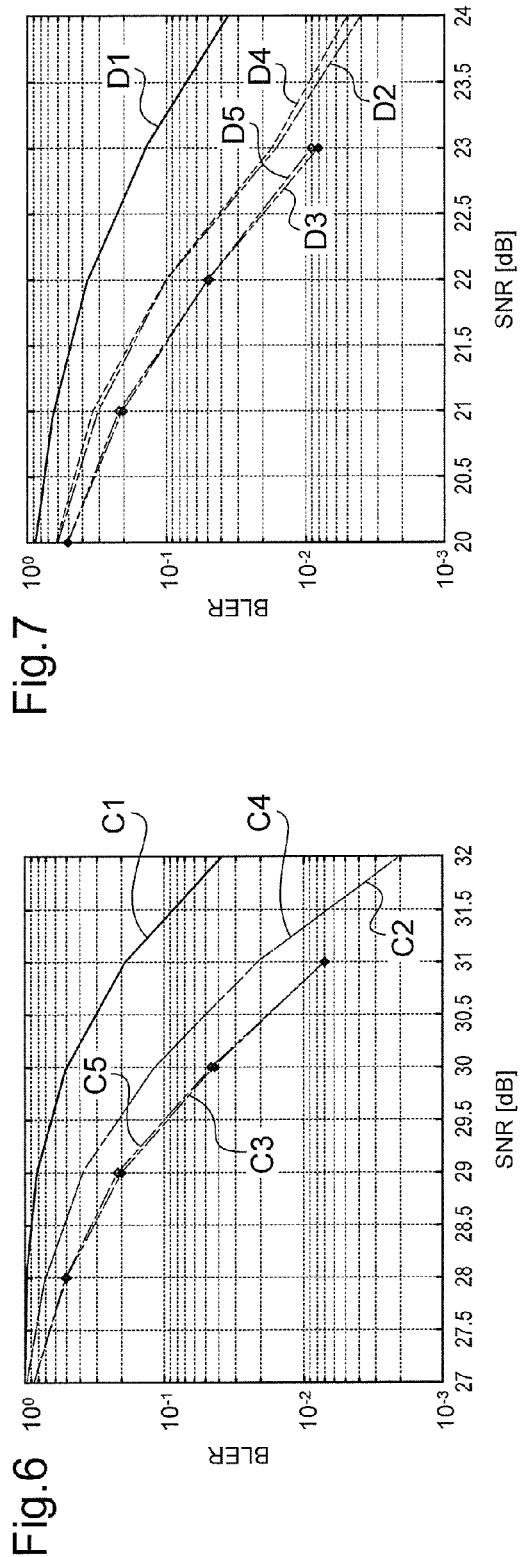

EQUALIZATION IN THE RECEIVER OF A MULTIPLE INPUT MULTIPLE OUTPUT SYSTEM

TECHNICAL FIELD

The invention relates to equalization methods used in the receiver of a multiple input multiple output (MIMO) system.

BACKGROUND

In an equalization method used in the receiver of a multiple input multiple output system, in which spatial multiplexing is performed, raising tremendously achieved bit rate while using reasonable supplementary resources, the detection and decoding, of the transmitted signal, at the receiver side, may be delicate, because of the mixing altogether of the signals transmitted by the different spatial layers of the multiple input multiple output system.

According to a first prior art, which deals with turbo equalization technique and which will be more detailed later with respect to FIG. 1, it is known to use a feedback signal from channel decoding to equalization in order to also use extrinsic information as for example the redundancy bits, and not only use the intrinsic information which is the information content of transmitted signal. An advantage of this first prior art is to exploit all available information to improve decoding, including information coming from the structure of the coding technique such as for example the redundancy bits. A drawback of this first prior art is that, for high bit rates using sophisticated modulation techniques such as complex constellations of coding symbols, the number of leaves in the search trees rapidly becomes very high and the way to process these leaves rather complex. Therefore, the needed resources to implement such a decoding technique soon become too important.

According to a second prior art, which deals with sphere decoding in equalization technique, it is known to build a search tree which is processed as well as shrunk during processing, to decode transmitted signals. An advantage of this second prior art is the efficiency to prune the search tree rapidly, which could otherwise become rapidly too big, having too many leaves to be processed. However, a drawback of this second prior art is that it uses only part of available information, since only the intrinsic information which is the information content of transmitted signal is analyzed and used, but not the extrinsic information which is the other available information coming from the structure of the coding technique as for example the redundancy bits. Examples of this second prior art are a first article [O. Paker, S. Eckert, A. Bury, "A Low Cost Multi-standard Near-Optimal Soft-Output Sphere Decoder: Algorithm and Architecture, IEEE DATE 2010], a second article [C. P. Schnorr, M. Euchner, "Lattice basis reduction: Improved practical algorithms and solving subset problems" Math. Programm., vol. 66, pp. 181-191, 1994], a third article [Studer, C.; Wenk, M.; Burg, A.; Bolcskei, FL "Soft-Output Sphere Decoding: Performance and Implementation Aspects" Fortieth Asilomar Conference on Computing and Processing, 2006].

According to a third prior art, for example disclosed in European patent application EP 2448205, it is known to make some approximation within the search tree used in sphere decoding in equalization technique to lower needed decoding time and resources. An advantage of this third prior art is to lower needed decoding time and resources, thanks to the made approximation. A drawback of this third prior art is that the made approximation can only be used with classical sphere decoding, and cannot be implemented when using other available information than the information content of the transmitted signal, like a priori information used in turbo equalization.

All these prior art techniques present a drawback, either they do not use all available information and therefore the efficiency of decoding is somewhat poor, or they need too much time and resources to be implemented.

SUMMARY

An object of embodiments of the present invention is to alleviate at least partly the above mentioned drawbacks.

More particularly, embodiments of the invention aim to benefit from both advantages, using all available information, including extrinsic information, contained in the transmitted signal, as well as using the pruning efficiency of a clever search tree building and processing. Therefore, embodiments of the invention aim to combine turbo equalization with sphere decoding, by using the feedback signal of channel decoding of the turbo equalization to build the search tree(s) used for sphere decoding in equalization.

Embodiments of the invention aim to introduce a novel sphere decoder that is capable of processing extrinsic information, which is a priori information, from a channel decoder and enables a joint equalization and channel decoding receiver architecture as known as turbo equalizer while at the same time using sphere decoding in the equalization process. Examples of channel decoding are Turbo, or Viterbi, or LDPC (Low Density Parity Check Codes). Channel decoding is the process of removing redundancy in the received bit stream and mapping the received signal to decoded original information bits.

Embodiments of the invention preferably aim to build the search tree(s) in the following way. Only the top level of the search tree may have numerous nodes, since each more top level node only gives two children nodes in a more bottom level. Advantageously, one the children node is obtained only by computing intrinsic information, for instance information content of transmitted signal by computing smallest Euclidean distance, and the other children node is obtained only by computing extrinsic information, for instance a priori information from feedback signal from channel decoding.

This object and other objects may be achieved with a method of equalizing, in a turbo equalizing system, by sphere decoding a signal transmitted over a channel by a multiple input multiple output system, comprising: receiving said transmitted signal, building at least one search tree, providing likelihoods of bits, for said transmitted signal, from said built search tree(s) and from said received transmitted signal, wherein equalizing method also comprises receiving feedback signal from a channel decoder of said turbo equalizing system, and wherein said feedback signal is used to build said search tree(s).

This object and other objects may also be achieved with an equalization method, using a feedback signal coming from channel decoding of turbo equalization processing, to build at least one search tree to perform sphere decoding.

This object and other objects may also be achieved with a method of turbo equalizing a signal transmitted over a channel by a multiple input multiple output system, comprising: equalizing said transmitted signal, channel decoding equalized signal while providing feedback signal from channel decoding to equalizing, wherein equalizing includes building at least one search tree to sphere decode said transmitted signal, and wherein said feedback signal is used to build said search tree(s).

This object and other objects may also be achieved with a turbo equalization method comprising equalization and channel decoding with a feedback loop from channel decoding to equalization, wherein a feedback signal of said feedback loop is used by equalization to build at least one search tree to perform sphere decoding.

This object and other objects may be achieved with a sphere decoder of a signal transmitted over a channel, being: adapted to build at least one search tree, adapted to provide likelihoods of bits, for said transmitted signal, from said built search tree(s) and from said received transmitted signal, wherein sphere decoder is also adapted to receive feedback signal from a channel decoder of a turbo equalizing system and to use said feedback signal to build said search tree(s).

This object and other objects may also be achieved with a turbo equalizer, comprising: an equalizer, a channel decoder, a feedback loop providing a feedback signal from said channel decoder to said equalizer, wherein said equalizer is adapted to build at least one search tree to perform sphere decoding and to use said feedback signal to build said search tree(s).

This object and other objects may also be achieved with a receiver of a multiple input multiple output system, comprising a sphere decoder as in embodiments of the invention or a turbo equalizer as in in embodiments of the invention.

All objects of invention are unitary with respect to one another since they all share in common that a feedback signal from a channel decoding of a turbo equalization process is used to build one or more search trees to perform sphere decoding in equalization process.

Preferred embodiments, which can be used in partial or total combination, and in combination of any of previous objects of the invention, comprise one or more of the following features:

said transmitted signal is coded with a given number of possible coding symbols, preferably with at least 4 coding symbols, more preferably with at least 16 coding symbols, even more preferably with at least 64 coding symbols.

one different search tree is built for each spatial layer of the multiple input multiple output system.

for each search tree, a top level of said search tree enumerates all possible coding symbols for the corresponding spatial layer, as top level children nodes all directly connected to a root of said search tree.

each search tree comprising as many levels as spatial layers in the multiple input multiple output system, hence comprising one or more bottom levels, at least one said bottom level, preferably each said bottom level, comprises only twice more children nodes than its contiguous upper level in said search tree, only two of its children nodes being connected to each children node of said contiguous upper level in said search tree, said two children nodes respectively corresponding to candidate coding symbols.

one of said two candidate coding symbols is computed as the best candidate from said received transmitted signal, and the other of said two candidate coding symbols is computed as the best candidate from said feedback signal.

said transmitted signal is coded according to coding symbols distributed in a constellation, preferably according to quadrature amplitude modulation.

said best candidate from said received transmitted signal is the candidate coding symbol presenting a corresponding Euclidean distance increment which is the smallest among all possible coding symbols, and the best candidate from said feedback signal is the candidate coding symbol which is the most likely when assessment is based only on said feedback signal.

a computer program product comprising a computer readable medium, having thereon a computer program comprising program instructions, the computer program being loadable into a data-processing unit and adapted to cause execution of the method according to any of preceding claims when the computer program is run by the data-processing unit.

Preferably, the new equalizer/detector which is developed according to embodiments of the invention supports multiple input multiple output (MIMO) channels. Over these multiple input multiple output channels, signals are transmitted by a wireless communication system with multiple transmitting (TX) and multiple receiving (RX) antennas. Preferred examples of standards according to such wireless communication are LTE (Long Term Evolution), WLAN (Wireless Local Area Network) as for instance 802.11n, or WiMax as for instance 802.11d/e.

Preferably, said provided likelihoods of bits are log likelihood ratios.

Preferably, to make said top level of each search tree, a specific transfer matrix of the multiple input multiple output system is decomposed in an orthogonal matrix and in a triangular matrix, and only swapping of columns are necessary to get from one specific transfer matrix to the other.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 5 shows an example of performing some steps of the equalization method in the turbo equalization method according to embodiments of the invention, with a multiple input multiple output system comprising three spatial layers.

FIG. 6 shows an example of performance in terms of signal to noise ratio as a function of the block error rate, when using the turbo equalization method according to embodiments of the invention, as compared to an optimal exhaustive but complex method.

FIG. 7 shows another example of performance in terms of signal to noise ratio as a function of the block error rate, when using the turbo equalization method according to embodiments of the invention, as compared to an optimal exhaustive but complex method.

DETAILED DESCRIPTION OF THE INVENTION

Figure 1:
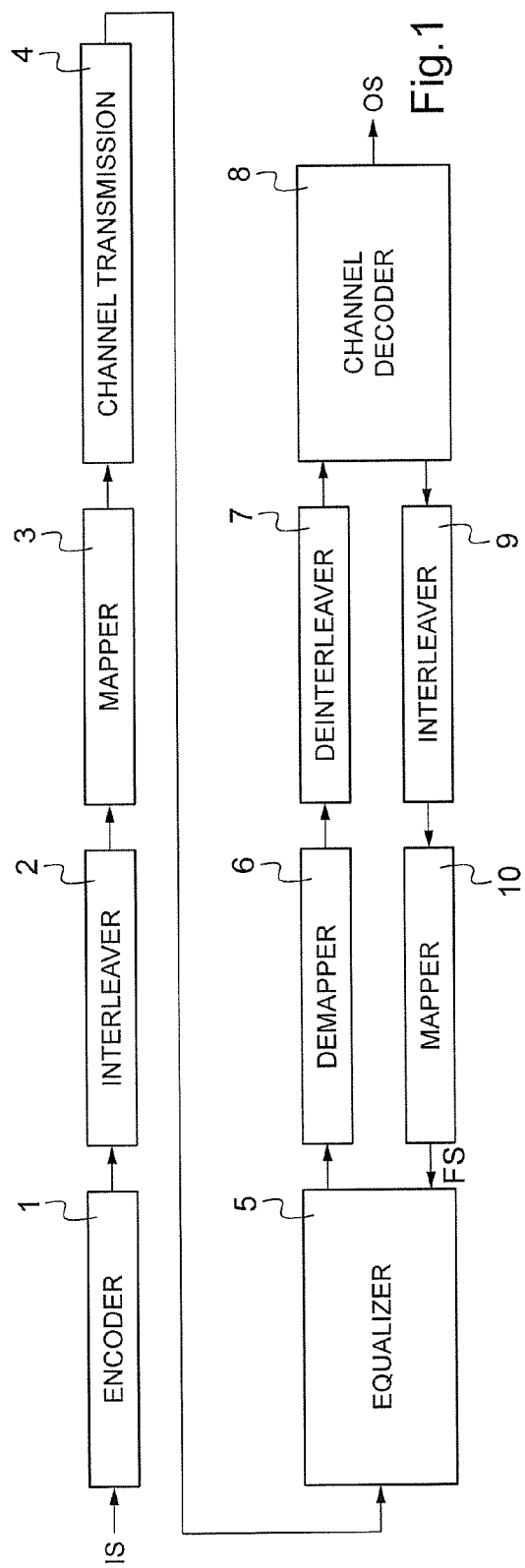
FIG. 1 shows an example of a turbo equalization system, according to prior art.

FIG. 1 shows an example of a turbo equalization system, according to prior art. There is an input signal IS which is constituted of information bits and which shall be transmitted from a transmitter side to a receiver side.

At transmitter side, the information bits of the input signal IS are encoded by an encoder 1. The encoder 1 adds redundancy bits to the information bits. Then the encoded bits are interleaved by an interleaver 2 to better protect information bits from bursting noise. The interleaved bits are then mapped into complex symbols by a mapper 3.

Afterwards, there is digital to analog conversion of the signal. The signal is then up converted to pass band frequencies by being mixed with a carrier signal. The signal is then transmitted through a communication channel. At receiver side, a mixing down converts the signal to baseband signal. There is then an analog digital conversion of the signal. Former operations have been summarized in channel transmission 4 on FIG. 1.

The signal is then equalized by an equalizer 5 which tries to cancel the inter symbol interference undergone by the transmitted signal. The signal is then demapped by a demapper 6 which performs the reverse operation of the mapper 2. The signal is then deinterleaved by an interleaver 7 which performs the reverse operation of the interleaver 3. Then, the channel decoder 8 achieves to decode the signal to get at the output signal OS which should be the closest possible to the input signal IS, so the channel decoder achieves to get back at the initial intrinsic signal.

In a turbo equalization system, there is also a loopback from channel decoder 8 to equalizer 5, successively via interleaver 9 and mapper 10. This time, thanks to the structure of the coding used, the decoder 8 outputs extrinsic information towards the interleaver 9. This extrinsic information is information which is not derived from input signal IS. This extrinsic information if back fed to the equalizer 5 as a priori symbol probability, it is noted as feedback signal FS. The equalizer uses this a priori information, with input signal IS, to estimate extrinsic probability of the bit values of the transmitted signal. This feedback loop allows for one or more iterations to be repeated by the turbo equalization. The number of iterations can be determined by the reaching of a stop criterion.

The turbo equalization is the realization of a receiver architecture where the equalizer 5 and the channel decoder 8 form a processing loop to continuously improve block error rates (BLER) during reception. The process works as follows. First, the equalizer 5 provides log likelihood ratios (LLR) to the channel decoder 8, only based on the information content in the received signal. The channel decoder 8, which is called turbo decoder for Long Term Evolution system, computes new log likelihood ratios using both the log likelihood ratios computed from the equalizer 5 and the encoding information, for instance the redundancy bits, added at the transmitter side. It feeds the computed log likelihood ratios back to the equalizer 5 forming an iteration of the turbo equalization technique. The equalizer 5 then further computes new log likelihood ratios combining the information content in the received signal and the feedback information from the channel decoder 8. These log likelihood ratios are fed back to the channel decoder 8 to further continue with the turbo equalization process, through several iterations.

Figure 2:
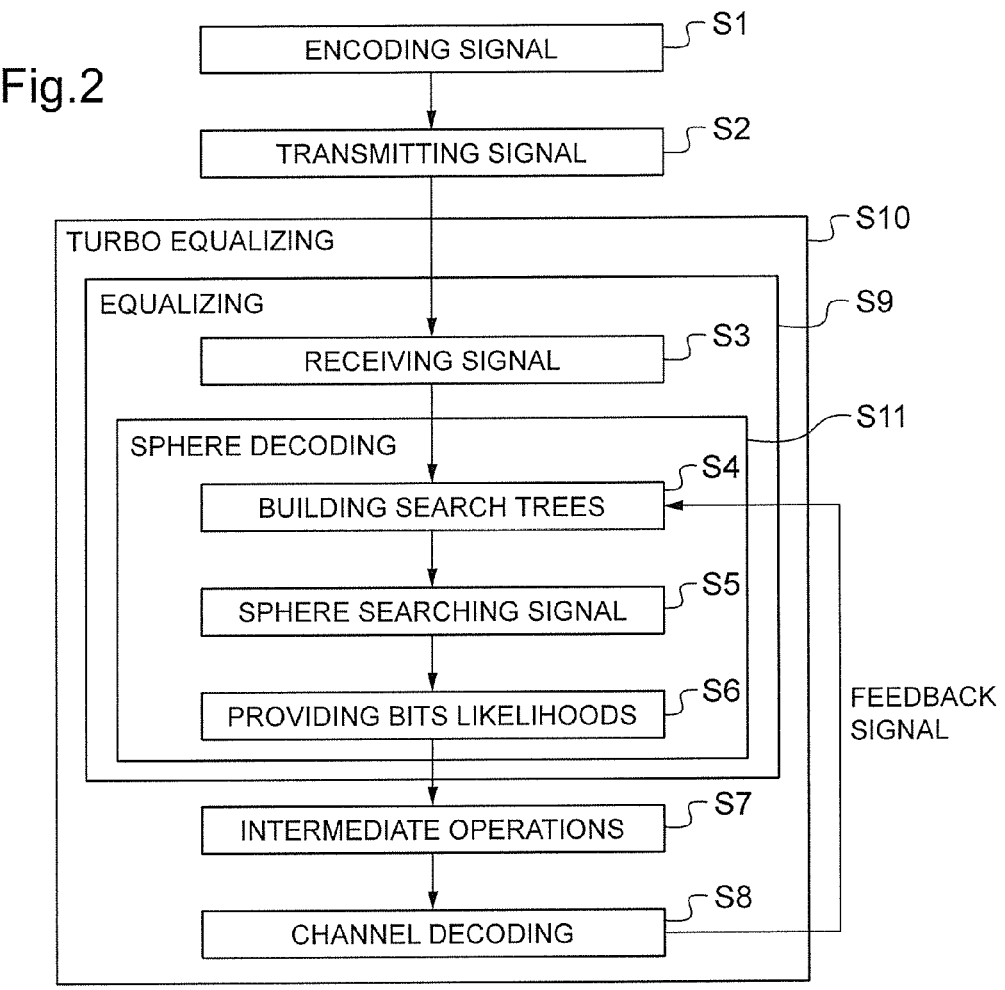
FIG. 2 shows an example of performing the steps of the turbo equalization method according to embodiments of the invention.

FIG. 2 shows an example of performing the steps of the turbo equalization method according to embodiments of the invention. At transmitter side, in a step S1 of encoding signal, the signal is encoded. Here encoding includes all pretreatment before transmission. In a step S2 of transmitting signal, the signal is transmitted over the channel of the multiple input multiple output system. All steps S1 to S10 of the method can also be considered as corresponding blocks of a corresponding system. Sphere decoding strictly speaking in the meaning of sphere searching is step S5 which will be mentioned in present text as sphere searching, whereas in a large meaning, sphere decoding will also include step S4 of building search trees and step S6 of providing bits likelihoods and it will be mentioned as sphere decoding S11.

At receiver side, the transmitted signal is received in a step S3 of receiving signal. Then, in a step S4 of building search tree(s), one or more search trees, preferably several search trees, preferably one search tree per spatial layer of the multiple input multiple output system, is or are built. Then, sphere searching is performed in a step S5 of sphere searching signal, sphere searching of the transmitted signal is performed by using the search trees built in previous step S4. Then, at the end of step S5, in a step S6 of providing bits likelihoods, bits likelihoods, preferably log likelihood ratios, are provided for the bits of the transmitted signal. Then intermediate operations are performed in a step S7 of intermediate operations, already described in more detail with respect to FIG. 1 and therefore not repeated here. Then, in a step S8 of channel decoding, a channel decoding of transmitted signal is performed.

But, at the same time, there is loopback from step S8 to step S4, with sending back a feedback signal from step S8 to step S4. In step S4, the feedback signal is used to build the search trees which will be used by step S5. Therefore, there are iterations with a loop between steps S4, S5, S6, S7, S8 and then back to step S4.

The steps S4 to S6 are encompassed in sphere decoding S11. The steps S3 to S6 are encompassed in an equalization method S9. Equalization method S9 and steps S7 and S8 are encompassed, all together with the feedback signal from step S8 to S4, in a turbo equalization method S10.

Now, the specific operations performed in the previous steps S3 to S8 of the turbo equalization method will be described in more detail. Starting with usual sphere decoding which is performed in usual equalization without using turbo equalization, so without the presence of a feedback loop from channel decoding to equalization, we will then introduce the specific sphere decoding according to embodiments of the invention. Sphere decoding is established as a feasible near optimal algorithmic technique for joint multiple input multiple output equalization and bit detection.

Assuming it is dealt with a narrow-band multiple input multiple output transmission of M transmitting and N receiving antennas. The transmission formula is given in equation 1:

$$y = Hs + n \qquad \text{(equation 1)}$$

In equation 1, y denotes the N×1 received signal vector. The M×1 transmitted quadrature amplitude modulation (QAM) symbol vector is denoted by s and noise is represented by the M×1 complex Gaussian noise n.

Furthermore, let the $q^{th}$ bit of a QAM symbol that is transmitted on antenna i be denoted by $b_{i,q}$. The log likelihood ratio of $b_{i,q}$ can be calculated using the max log approximation as shown in equation 2:

$$LLR(b_{i,q}) = \frac{1}{\sigma^2}\left(\min_{s \in C_{i,q,0}} \|y - Hs\|^2 - \min_{s \in C_{i,q,1}} \|y - Hs\|^2\right) \quad \text{(equation 2)}$$

In equation 2, $C_{i,q,0}$ refers to the set of symbol vectors denoted by s, where the QAM symbol transmitted on the $i^{th}$ antenna has a logical "0" at the $q^{th}$ bit position. Similarly, $C_{i,q,1}$ refers to the same antenna index and bit position where the logical value is "1". Solving equation 2 for $b_{i,q}$ requires searching for symbol vectors s that have the minimum Euclidean distance to the received signal vector y for a particular bit position and value (0 or 1), reflected in the minimum function for both arguments in equation 2.

A trivial way of solving equation 2 requires performing an exhaustive search over the whole set of transmitted symbol vectors. But, this is not easily feasible for an implementation as the search space for a multiple input multiple output system with M transmitting antennas (and M receiving antennas, so that there are M spatial layers) employing 64-QAM has a vector space consisting of $64^M$ symbol vectors. For instance, if M=2, that implies a search space of 64*64 which means 4096 symbol vectors. For Long Term Evolution, this implies 68 billion (4096*1200*14000) symbol vectors per second to process. Even if a 1 GHz capable digital signal processor (DSP) can be assumed, the processing requirements would imply the use of 68 such digital signal processors, which would be very expensive with respect to silicon area and power consumption, making it practically too complex and too expensive.

Existing sphere decoders are known to be able to efficiently solve equation 2 by avoiding the exhaustive search mentioned above. The principle behind sphere decoding is to create a sphere around the received signal and prune the search space by only searching within that sphere. During the decoding process, the sphere and therefore the search space is shrunk gradually, thereby further accelerating the search process.

Figure 3A:
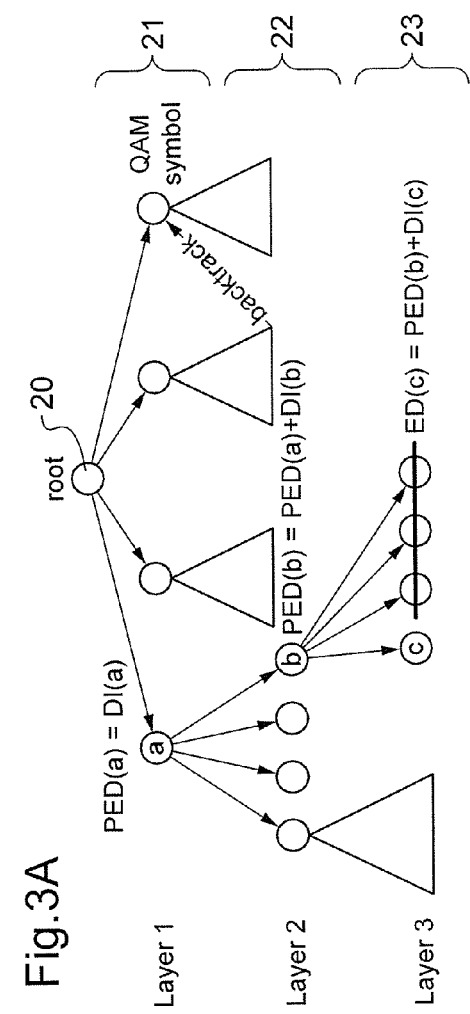
FIG. 3A shows an example of a search tree used in sphere decoding performed in equalization method, not using turbo equalization, according to prior art.

FIG. 3A shows an example of a search tree used in sphere decoding performed in equalization method, not using turbo equalization, according to prior art. The sphere decoder algorithm consists of two parts which are first pre-processing and then sphere searching. The pre-processing usually in the form of a decomposition in an orthogonal matrix Q and in an upper triangular matrix R (then called QR decomposition) creates a search tree structure where the sphere decoder performs the search as shown in FIG. 3A. Each node 20, 21, 22 and 23, in the formed search tree is a QAM symbol. Layers 1, 2 and 3, are levels of the search tree which respectively correspond to spatial layers of the multiple input multiple output system. The number of spatial layers is linked to the number of transmitting antennas and the number of receiving antennas. For example a system with 3 transmitting antennas and 3 receiving antennas will have 3 spatial layers, whereas a system with 3 transmitting antennas and 2 receiving antennas will have 2 spatial layers and whereas a system with 2 transmitting antennas and 3 receiving antennas will have 2 spatial layers. Successively, in the search tree, there are the root 20, the top level comprising the children nodes 21, an intermediate level comprising the children nodes 22, and a bottom level comprising the children nodes 23 which also are the leaves of the search tree.

Each branch from root 20 to a leaf 23 of this search tree forms a symbol vector. For the search process to work efficiently, which means to be able to prune as many QAM symbol vectors as possible at earlier stages, ordering of QAM symbols per search tree level based on their distance increment (DI) is preferred. Exact ordering is known as Schnorr-Euchner ordering. If a QAM symbol has partial Euclidean distance (PED) that is larger than the radius of the sphere, the search can be stopped without trying the symbols corresponding to the children node of that level connected to a same node of the upper level. The search is to be backtracked to an upper level in the tree as shown by the arrow "backtrack" on FIG. 3A.

The symbol ordering does not even need to be computed exactly. But an approximate order can be stored in a look-up table, simplifying the implementation significantly. Furthermore, symbol ordering at the bottom level of the search tree is not needed. For instance, siblings of node c do not have to be considered, provided node c has the smallest distance increment (DI). The sphere decoder only needs the QAM symbol that has the smallest partial Euclidean distance with respect to the received signal at this level. Because any other symbol will have a larger partial Euclidean distance compared to this symbol, because of having a larger distance increment, and it will have an overall Euclidean distance (ED) larger than that of the symbol vector formed with the closest QAM symbol at the bottom level.

On FIG. 3A, it can be seen a search tree generated after QR decomposition, consisting of 3 spatial layers, each QAM symbol associated with a distance increment. If overall Euclidean distance of node c is below the current radius, the corresponding symbol vector will be stored as a possible solution, and the radius of the sphere will be shrunk to this very overall Euclidean distance of node c. The partial Euclidean distance of node a is equal to the distance increment of node a. The partial Euclidean distance of node b is equal to the sum of the partial Euclidean distance of node a and the distance increment of node b. The partial Euclidean distance of node c is equal to the sum of the partial Euclidean distance of node b and the distance increment of node c.

Ordering at each tree level and finding the closest symbol at the bottom level can be rather easily computed or even approximated without any significant algorithmic performance degradation, by using geometrical aspects of the signal constellation. For instance, finding the closest signal at the bottom level can be simply rounding the received signal to the nearest constellation point after the QR decomposition process has been performed. Symbol ordering, similarly requires first finding the closest QAM symbol and then using that as an index to a look-up table.

However, in a desired receiver capable of turbo equalization, the equalizer would have to also consider a priori information from the channel decoder (or from the turbo decoder) into account while computing log likelihood ratios. The new log likelihood ratio formula will be given by equation 3:

$$LLR(b_{i,q}) = \min_{s \in C_{i,q,0}}\left(\frac{\|y - Hs\|^2}{\sigma^2} - \log P(s)\right) - \min_{s \in C_{i,q,1}}\left(\frac{\|y - Hs\|^2}{\sigma^2} - \log P(s)\right) \quad (3)$$

The a priori information from the channel decoder is given in the log(P(s)) term in equation 3. Formula of equation 3 implies that the two aspects which created a feasible sphere decoder for solving equation 2 are not applicable anymore. Indeed, these were first ordering at a search tree level and then finding the QAM symbol with the smallest distance increment (DI). The main issue is that the distance increment for a particular symbol now includes not only the Euclidean distance increment but also the a priori information contribution from the channel decoder, indeed given by the log(P(s)) term. For instance, a QAM symbol that has the smallest Euclidean distance increment, corresponding to only the first argument of the minimum function of equation 3, may have an overall distance increment, which is computed by adding the log(P(s)) term, that will be larger than another QAM symbol, simply because of having a larger a priori contribution assumed to be −1*log(P(s)).

Embodiments of the invention preferably aim at a new soft input capable sphere decoder algorithm that solves equation 3 without practically any algorithmic performance degradation while at the same time being a feasible and reasonable option for silicon implementation thanks to a limited complexity of the search trees that are computed.

Embodiments of the invention preferably aim to avoid QAM symbol ordering for the top level of a search tree by fully enumerating all possible symbols. For instance, a 64-QAM modulation scheme requires 64 children nodes connected to the root 20 of the search tree. Furthermore, each spatial layer is forced to become the top level of such a search tree by performing QR decompositions multiple times, in more detail one on the multiple input multiple output channel, and others on the modified multiple input multiple output channel by swapping appropriate columns of the original channel. Having all possible symbols for a spatial layer makes sure that all possible bit combinations for that particular spatial layer are considered.

The expansion of the search tree, performed by forward traverse stage of sphere decoding, from the top level of the search tree to its bottom levels is done by processing according to a rather simple rule which can be expressed as follows. For each branch of the top level, two candidate QAM symbols should be taken as a forward traverse possibility, equation 3 should be computed for both candidates and the symbol with the smallest overall distance given in equation 3 should be picked up. The matrix H in equation 3 has to be pre-processed with QR decomposition and the multiple input multiple output channel dimension has to be reduced to the particular spatial layer which is chosen as top level of the search tree.

For a multiple input multiple output system with 2 transmitting antennas and 2 receiving antennas, that is with 2 spatial layers, using 64-QAM modulation, that means that two search trees will be created, one for each spatial layer. Each search tree has 64 symbols at the top level and the search considers 2 symbols at the second level to proceed to the bottom level. For each search tree, 64 top level and 2*64 bottom level QAM symbols are processed, leading to a total number of 384 QAM symbols processed per subcarrier, indeed 2*(64+2*64) processed symbols. This is more than an order of magnitude smaller than the exhaustive solution which has been discussed above, and it can lead to a feasible and reasonable implementation.

Figure 3B:
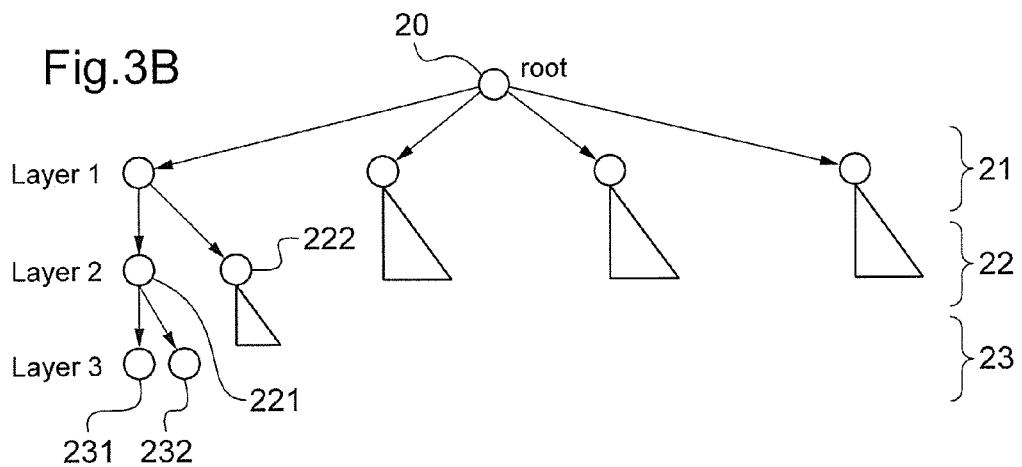
FIG. 3B shows an example of a search tree used in sphere decoding performed in equalization method in the turbo equalization method according to embodiments of the invention.

FIG. 3B shows an example of a search tree used in sphere decoding performed in equalization method in the turbo equalization method according to embodiments of the invention. Here, three spatial layers have been kept for the search tree, so that the structure and number of children nodes of the search tree can be compared to the structure and number of children nodes of the search tree represented on FIG. 3A.

Root 20 is the same and top level comprises the same number of children nodes 21. However, for all bottom levels, it can be seen that there are only two children nodes connected to a children node of the upper level. In detail, layer 2 presents only children nodes 221 and 222 connected to a children node of layer 1. Layer 3 presents only children nodes 231 and 232 connected to a children node 221 of layer 2.

Figure 4:
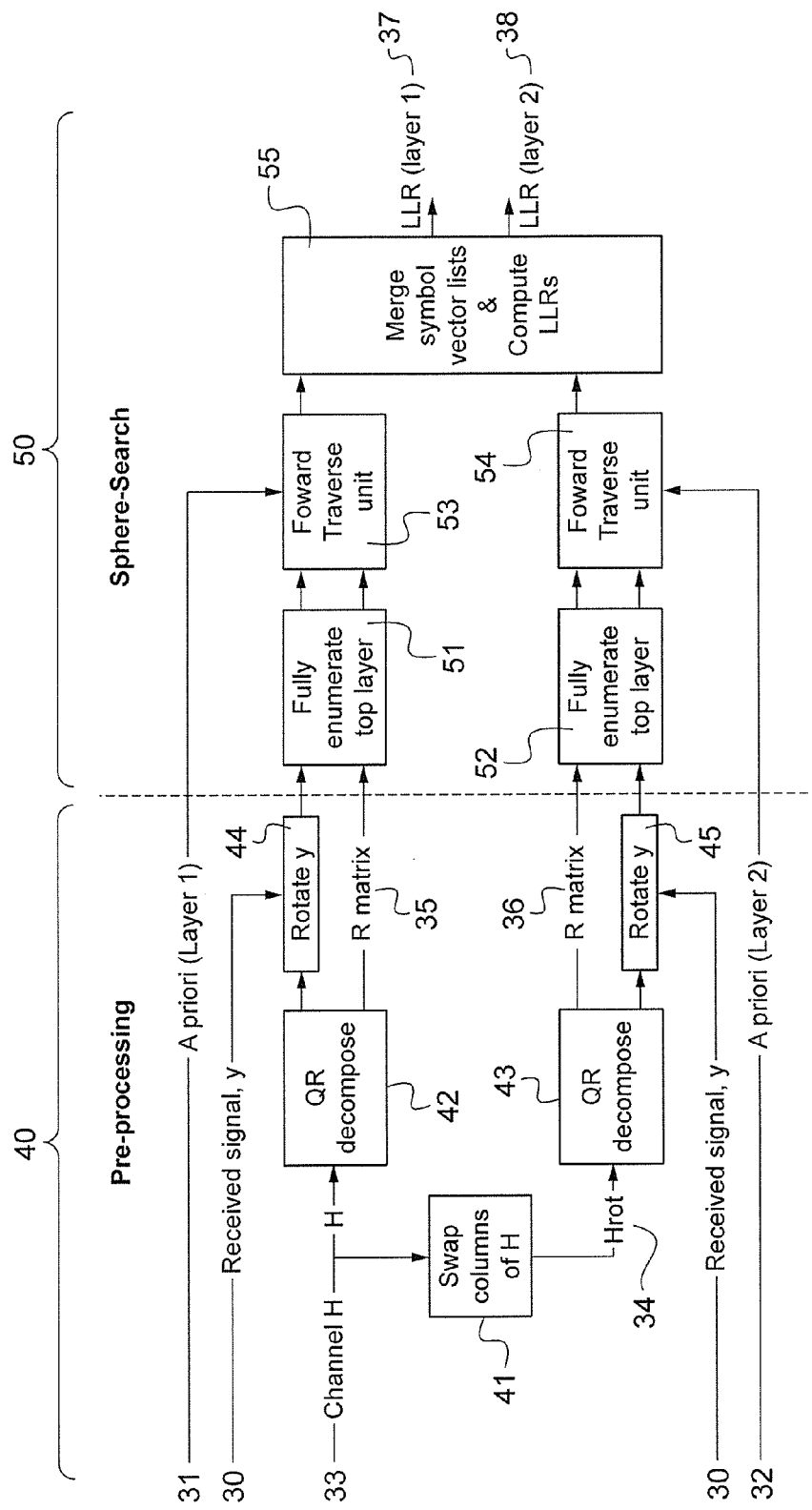
FIG. 4 shows an example of performing some steps of the equalization method in the turbo equalization method according to embodiments of the invention, with a multiple input multiple output system comprising two spatial layers.

FIG. 4 shows an example of performing some steps of the equalization method in the turbo equalization method according to embodiments of the invention, with a multiple input multiple output system comprising two spatial layers. There are a pre-processing phase 40 followed by a sphere searching phase 50.

Several steps are successively performed to generate a soft input soft output sphere decoder. First, QR decomposition 42 is performed on the MIMO channel in pre-processing phase 40. Then, the last column of the MIMO channel is swapped 41 with the column corresponding to the desired spatial layer and corresponding QR decomposition 43 is performed.

Afterwards, in sphere searching phase 50, all possible QAM symbols are fully enumerated, 51 and 52, for the top level of each search tree respectively generated by all the QR decomposition processes 42 and 43. Then, each search tree is expanded by computing equation 3 for the best candidate in the Euclidean sense, which means QAM symbol with the smallest Euclidean distance increment, what would correspond on FIG. 3B for layer 2 to children node 221, and for layer for the most likely symbol indicated by the log probability calculation based on a priori information, what would correspond on FIG. 3B for layer 2 to children node 222. Then the QAM symbol with the smallest overall distance given by equation 3 is selected.

FIG. 4 shows indeed a soft-input soft-output sphere decoder for a 2×2 MIMO system. The equalizer comprises two blocks, respectively first to perform the pre-processing phase 40 and then to perform the sphere searching phase 50. Pre-processing phase 40 performs QR decomposition 42 of the original channel matrix H and the matrix Hrot which is formed by swapping 41 the columns of H as described above. The original channel matrix H is preferably calculated in a previous stage in the receiver. The received signal vector y 30 is rotated 44 with the Q matrix resulting from the decomposition 42. This "rotate" block 44 essentially multiplies y with Hermitian transpose of the Q matrix denoted as $Q^H$. The R matrix 35 and the rotated y 30 vector are provided to the second sphere searching phase 50. The search tree formation starts by fully enumerating the top layer of the search tree which is the bottom row of the R matrix 35. R matrix 35 is an upper triangular matrix and any search process will start from the bottom row that only has a single unknown. The full enumeration at the top layer means computing only the bottom row of equation 3 for all QAM symbols.

The forward traverse unit (FTU) 53 is to find an appropriate symbol for the forward traverse stage of the search tree in sphere decoding. It assumes not only the top level QAM symbols as input but also the a priori information 31. In the forward traverse unit 53, equation 3 is computed for only two QAM symbols. One is selected by finding the symbol with the smallest Euclidean distance increment, which preferably means simply round the rotated y for this level to the closest QAM symbol in the constellation. The other is selected by observing the most likely QAM symbol based only on a priori information 31. This can be done by looking at sign bits of the a priori information 31 related to this spatial layer. The exploitation of H, received signal y 30, and a priori information 31, ends by selecting the best symbol for the bottom layer, forming a branch from the particular top level symbol to the leaf or here forming a possible symbol vector of size 2×1.

For the second spatial layer, there is a similar performing of operations, with QR decomposition 43, with y rotation 45, with R matrix 36, with fully enumerating the top layer 52, with forward traverse stage 54 using a priori information 32.

All the symbol vectors, here of size 2×1, formed by the full enumeration 51 and 52 and forward traverse unit blocks 53 and 54, are used to compute minimum distances given in equation 3 for each antenna index i and bit position q in the last block 55 denoted as "Merge symbol vector list & compute log likelihood ratios (LLRs)". At the output of this block 55, there can be found log likelihood ratios 37 for spatial layer 1, as well as log likelihood ratios 38 for spatial layer 2.

FIG. 5 shows an example of performing some steps of the equalization method in the turbo equalization method according to embodiments of the invention, with a multiple input multiple output system comprising three spatial layers. FIG. 5 shows indeed a 3×3 soft input soft output sphere decoder using the same principle as FIG. 4, but this time for a 3×3 MIMO system.

Similarly to FIG. 4, in FIG. 5, QR decompositions 63, 64 and 65, are performed. By swapping, in 61 and 62, the last column denoted by H3 of the channel matrix H, with the first and second columns denoted by H1 and H2, each spatial layer will appear on the top layer of one of the three search trees. Search trees respectively fully enumerate, in 69, 70 and 71, their top layer, making sure that each spatial layer has all symbol combinations. Because the depth of the search trees is now 3 stages, the forward traverse units 72 to 77 respectively first perform the same process for the second level, with forward traverse units 72 to 74, and then for the third level, with forward traverse units 75 to 77, for each particular search tree, so forward traverse unit operation is performed twice for each search tree. At the end of the second forward traverse unit, 75, 76 or 77, of each search tree, the algorithm produces symbol vectors of size 3×1. Some of these vectors can overlap with the vectors found for the other search trees. Here again, the final block 78 creates a union of the symbol vector space and uses this set to compute equation 3 for all i and q values. At output of block 78, there can be found log likelihood ratios 83 for spatial layer 1, 84 for spatial layer 2 and 85 for spatial layer 3.

FIG. 6 shows an example of performance in terms of signal to noise ratio as a function of the block error rate, when using the turbo equalization method according to embodiments of the invention, as compared to an optimal exhaustive but complex method.

FIG. 7 shows another example of performance in terms of signal to noise ratio as a function of the block error rate, when using the turbo equalization method according to embodiments of the invention, as compared to an optimal exhaustive but complex method.

Both simulations show that embodiments of the invention match the optimal algorithmic behavior, in block error rate (BLER) meaning, and uses far less symbol vectors, better than 10 time less symbol vectors what is more than an order of magnitude better, as compared to the optimal exhaustive search algorithm. This makes it a feasible and reasonable method, as well as attractive, for the present and next generation of modems.

Curves C1 and D1 correspond to no feedback signal, no iteration, no turbo equalization, so to classical equalization using sphere decoding. Curves C2 and D2 and C4 and D4 correspond to turbo equalization with two iterations. Curves C3 and D3 and C5 and D5 correspond to turbo equalization with three iterations.

Simulations have been performed for various fading channel models used for Long Term Evolution, based on the amount of channel correlation involved. FIG. 6 corresponds to a high degree of channel correlation in the MIMO system, whereas FIG. 7 corresponds to a low degree of channel correlation in the MIMO system. For all studied cases, the new algorithm according to embodiments of the invention, represented by the curves C4, C5, D4 and D5, respectively matches the optimal curves C2, C3, D2 and D3, for a BLER of $10^{-1}$.

Two simulations are provided for the most demanding use-case, which corresponds to 64-QAM, for high and low correlation channels, respectively shown in FIGS. 6 and 7. The block size used for these simulations is 5760 and the code rate is 0.75. It can be seen that for high channel correlation, as shown in FIG. 6, the matching is almost exact, whereas for low channel correlation, as shown in FIG. 7, the matching is very good, but not as good as in FIG. 6.

The invention has been described with reference to preferred embodiments. However, many variations are possible within the scope of the invention.

The invention claimed is:

1. A method of equalizing, in a turbo equalizing system, by sphere decoding a signal transmitted over a channel by a multiple input multiple output (MIMO) system, the method comprising:
    receiving the transmitted signal;
    building more than one search tree;
    providing likelihoods of bits, for the transmitted signal, from the built search trees and from the received transmitted signal;
    receiving a feedback signal from a channel decoder of the turbo equalizing system;
    wherein the feedback signal is used to build the search trees, and wherein at least one different search tree is built for each spatial layer of the MIMO system.

2. The method of equalizing of claim 1, wherein the transmitted signal is coded with a given number of possible coding symbols.

3. The method of equalizing of claim 1, wherein, for each search tree, a top level of the search tree enumerates all possible coding symbols for the corresponding spatial layer as top level children nodes all directly connected to a root of the search tree.

4. The method of equalizing of claim 1, wherein the transmitted signal is coded according to coding symbols distributed in a constellation.

5. The method of equalizing of claim 3:
    wherein each search tree comprises as many levels as spatial layers in the MIMO system, and therefore comprises more than one bottom level;
    wherein at least one of the bottom levels comprises only twice more children nodes than its contiguous upper level in the search tree, and wherein only two of its children nodes are connected to each children node of the contiguous upper level in the search tree, the two children nodes respectively corresponding to candidate coding symbols.

6. The method of equalizing of claim 5:
    wherein one of the two candidate coding symbols is computed as the best candidate from the received transmitted signal; and wherein the other of the two candidate coding symbols is computed as the best candidate from the feedback signal.

7. The method of equalizing of claim 6:
wherein the best candidate from the received transmitted signal is the candidate coding symbol presenting a corresponding Euclidean distance increment which is smallest among all possible coding symbols;
wherein the best candidate from the feedback signal is the candidate coding symbol which is the most likely when assessment is based only on the feedback signal.

8. A method of turbo equalizing a signal transmitted over a channel by a multiple input multiple output (MIMO) system, the method comprising:
equalizing the transmitted signal;
channel decoding the equalized signal while providing a feedback signal from channel decoding to the equalizing;
wherein the equalizing includes building more than one search tree to sphere decode the transmitted signal;
wherein the feedback signal is used to build the search trees, and wherein at least one different search tree is built for each spatial layer of the MIMO system.

9. A computer program product stored in a non-transitory computer readable medium for handling equalizing, in a turbo equalizing system, by sphere decoding a signal transmitted over a channel by a multiple input multiple output (MIMO) system, the computer program product comprising software instructions which, when run on a processing circuit, causes the processing circuit to:
receive the transmitted signal;
build more than one search tree;
provide likelihoods of bits, for the transmitted signal, from the built search trees and from the received transmitted signal;
receive a feedback signal from a channel decoder of the turbo equalizing system;
wherein the feedback signal is used to build the search trees, and wherein at least one different search tree is built for each spatial layer of the MIMO system.

10. A computer program product stored in a non-transitory computer readable medium for turbo equalizing a signal transmitted over a channel by a multiple input multiple output (MIMO) system, the computer program product comprising software instructions which, when run on a processing circuit, causes the processing circuit to:
equalize the transmitted signal;
channel decode the equalized signal while providing a feedback signal from channel decoding to the equalizing;
wherein the equalizing includes building more than one search tree to sphere decode the transmitted signal;
wherein the feedback signal is used to build the search trees, and wherein at least one different search tree is built for each spatial layer of the MIMO system.

11. A turbo equalizer, comprising:
an equalizer comprising a sphere decoder;
a channel decoder; and
a feedback loop providing a feedback signal from the channel decoder to the equalizer,
wherein the sphere decoder is configured to:
build at least one search tree using the feedback signal;
provide likelihoods of bits, for a signal transmitted over a channel of a multiple input multiple output (MIMO) system, from the at least one search tree and from the signal transmitted over the channel; and
wherein at least one different search tree is built for each spatial layer of the MIMO system.

12. A receiver of a multiple input multiple output (MIMO) system, comprising:
a turbo equalizer, wherein the turbo equalizer comprises:
an equalizer comprising a sphere decoder;
a channel decoder; and
a feedback loop providing a feedback signal from the channel decoder to the equalizer,
wherein the sphere decoder is configured to:
build at least one search tree using the feedback signal;
wherein at least one different search tree is built for each spatial layer of the MIMO system.

13. The receiver of claim 12, wherein the sphere decoder is configured to provide likelihoods of bits, for a signal transmitted over a channel of the MIMO system, from the at least one search tree and from the signal transmitted over the channel.

* * * * *